United States Patent
Hehl

(10) Patent No.: US 7,890,880 B2
(45) Date of Patent: Feb. 15, 2011

(54) METHOD AND DEVICE FOR INTERACTIVE CONTROL OF A MACHINE

(76) Inventor: Karl Hehl, Karl Hehl, Arthur-Hehl-Strasse, D-72290 Lossburg (DE)

( * ) Notice: Subject to any disclaimer, the term of this patent is extended or adjusted under 35 U.S.C. 154(b) by 1305 days.

(21) Appl. No.: 10/562,987

(22) PCT Filed: Jul. 23, 2004

(86) PCT No.: PCT/EP2004/008264

§ 371 (c)(1),
(2), (4) Date: Dec. 29, 2005

(87) PCT Pub. No.: WO2005/009719

PCT Pub. Date: Feb. 3, 2005

(65) Prior Publication Data

US 2006/0157880 A1 Jul. 20, 2006

(30) Foreign Application Priority Data

Jul. 26, 2003 (DE) ................................ 103 34 153

(51) Int. Cl.
*G06F 3/00* (2006.01)
*G06F 3/048* (2006.01)
(52) U.S. Cl. .................. 715/771; 715/713; 715/744
(58) Field of Classification Search ............... 715/771, 715/713, 744
See application file for complete search history.

(56) References Cited

U.S. PATENT DOCUMENTS 4,674,053 A * 6/1987 Bannai et al. ............... 700/197

(Continued)

FOREIGN PATENT DOCUMENTS

CA 2095452 5/1993

(Continued)

OTHER PUBLICATIONS

Canadian Intellectual Property Office, Office Action for related Canadian Patent Application No. 2,533,842, mailed Sep. 25, 2009.

*Primary Examiner*—Doug Hutton
*Assistant Examiner*—Soumya Dasgupta
(74) *Attorney, Agent, or Firm*—Stites & Harbison, PLLC; David W. Nagle, Jr.; Terry L. Wright

(57) ABSTRACT

The invention relates to a method and a device for interactive control of a machine, whereby the operating parameters necessary for the working process of the machine are inputted into a data processing unit (12), for storing the operating parameters, using an input unit (10) with input fields in a form which guides the user. Working processes are thus carried out as a result of the inputs. A data set of the base rules for the working process of the machine is recorded in the data processing unit. A limited selection (11) of possible input choices is provided for the user by application of the data set based on the machine configuration and machine environment, which further comprise compatible parts for addition to the extant parts of a working process. Operator guidance is facilitated, whereby the user is provided with a limited selection (11), corresponding to the further parts of the process, on operating fields, by the input unit (10) on the surface (16) for manual input and/or for input using a manipulator (38).

25 Claims, 6 Drawing Sheets

U.S. PATENT DOCUMENTS

| | | | |
|---|---|---|---|
| 5,539,650 A | 7/1996 | Hehl | |
| 6,112,201 A * | 8/2000 | Wical | 1/1 |
| 6,240,410 B1 * | 5/2001 | Wical | 707/4 |
| 6,684,264 B1 * | 1/2004 | Choi | 710/15 |
| 6,725,184 B1 * | 4/2004 | Gadh et al. | 703/2 |
| 6,883,143 B2 * | 4/2005 | Driskell | 715/763 |
| 6,892,361 B2 * | 5/2005 | Kandogan | 715/837 |
| 6,959,421 B1 * | 10/2005 | Bartz et al. | 715/821 |
| 7,089,266 B2 * | 8/2006 | Stolte et al. | 707/769 |
| 7,260,537 B2 * | 8/2007 | Creamer et al. | 704/270.1 |
| 7,392,492 B2 * | 6/2008 | Hong et al. | 716/103 |
| 7,552,395 B2 * | 6/2009 | Neale et al. | 715/763 |
| 7,558,674 B1 * | 7/2009 | Neilley et al. | 702/3 |
| 7,590,638 B2 * | 9/2009 | Petculescu et al. | 1/1 |
| 2002/0046009 A1 * | 4/2002 | Devaquet et al. | 703/1 |
| 2003/0217129 A1 * | 11/2003 | Knittel et al. | 709/223 |
| 2004/0021698 A1 * | 2/2004 | Baldwin et al. | 345/853 |

FOREIGN PATENT DOCUMENTS

DE        35 45 360        6/1987

* cited by examiner

METHOD AND DEVICE FOR INTERACTIVE CONTROL OF A MACHINE

REFERENCE TO RELATED APPLICATIONS

The present application claims the priority of German patent application 103 34 153.6, filed on Jul. 26, 2003, the disclosure contents of which are hereby expressly also made the object of the present application.

FIELD OF THE INVENTION

The invention relates to a method and an apparatus for the interactive control of a machine, more especially a plastics material injection molding machine in accordance with the preamble of claims 1 and 15.

STATE OF THE ART

Such a method is known in EP 0 573 912 B1. In this case, basic knowledge or a data set covering the basic rules of the operation of an injection molding machine is recorded in a data processing unit. The machine additionally detects the existing machine configuration and machine environment such as, for example, peripheral devices, and offers the machine user a sequence editor to generate a machine sequence. On account of the information present in the data processing unit covering sequences and machine, at input there is always only a selected choice of input possibilities made available to the operator visually on a screen surface for additional parts of the sequence, on the part of machine and injection molding tool, that can be added in a compatible manner to the already existing parts. This means that the input of operating sequences is simplified and facilitated.

Nevertheless, as previously, the operator has to input the creation of the interactive operating sequence using conventional keyboards which means that, in spite of the selected choice of input possibilities, the operator has to be trained to know which input fields of the keyboard have to be actuated for an input. This necessitates corresponding expenditure on training and can result in time lost in the injection molding operation.

DE 102 46 925 A1 proposes the independent selection of safety conditions for an injection molding machine, such that a choice of actuating elements can be provided based on the safety conditions chosen. A link is certainly made between the basic information of the injection molding process and the safety conditions, but a spatial limitation or defining of the input fields for the navigation on the operating surface is only provided for the first navigation level. An additional navigation level and a sequence diagram are provided on the screen surface, however, not in a region of a stationary navigation surface.

The evaluation of injection parts manufactured on an injection molding machine by setting tolerance bands and the use of a joystick for program selection is known in DE 35 45 360 A1, more especially column 7, lines 37-42.

SUMMARY OF THE INVENTION

Proceeding from this state of the art, the object of the present invention is to improve a method and an apparatus for the interactive control of an injection molding machine to the effect that the creation of a sequence is further simplified.

This object is achieved by means of a method and an apparatus with the features of claims 1 and 15.

The operator interface is further improved in that the controlling means presents the operator with a choice of actuating fields for navigation, also selected, which makes it easy for him to select the input possibilities for the additional parts of the operating sequence from this selected choice. He is presented on the surface with dynamic input fields, which alter each time the user makes an input, such that, as the creation of the operating sequence progresses, the input possibilities for the operator become clearer and clearer. This makes the input clearer to the operator.

In addition, it is preferable for the surface to be divided in such a manner that simplified navigation is possible. Using a few lines or columns, which are definable on the screen surface as the navigation surface, a navigation process is possible which not only simplifies the input for the user but also makes the parameter regions become clearer. The user always knows where he is in the sequence. In this case, the representation can be specifically altered for the user. The advanced user, for example, can use navigation references as symbols in one, for example the top line, whilst sequence editor and bottom navigation levels are represented in the remaining lines.

It is also possible to provide an operator region with favorite fields, which enable a direct jump into a certain parameter image. This means that by bypassing the navigation steps actually required to do so, it is possible to jump in each case to the parameter image edited last in the associated parameter group. Consequently, it is possible, for example, for the user to jump directly backwards and forwards between image regions which do not belong together in a strictly hierarchical manner but which often have to be edited and/or observed alternately in the operating sequence.

Further advantages can be found in the subclaims.

BRIEF DESCRIPTION OF THE FIGURES

The invention will be described in more detail below by way of the attached Figures. In which.

DETAILED DESCRIPTION OF THE PREFERRED EXEMPLIFIED EMBODIMENTS

The invention will now be described in more detail as an example with reference to the attached drawings. However, the exemplified embodiments are only examples that are not to restrict the inventive concept to one specific disposition.

Figure 1:
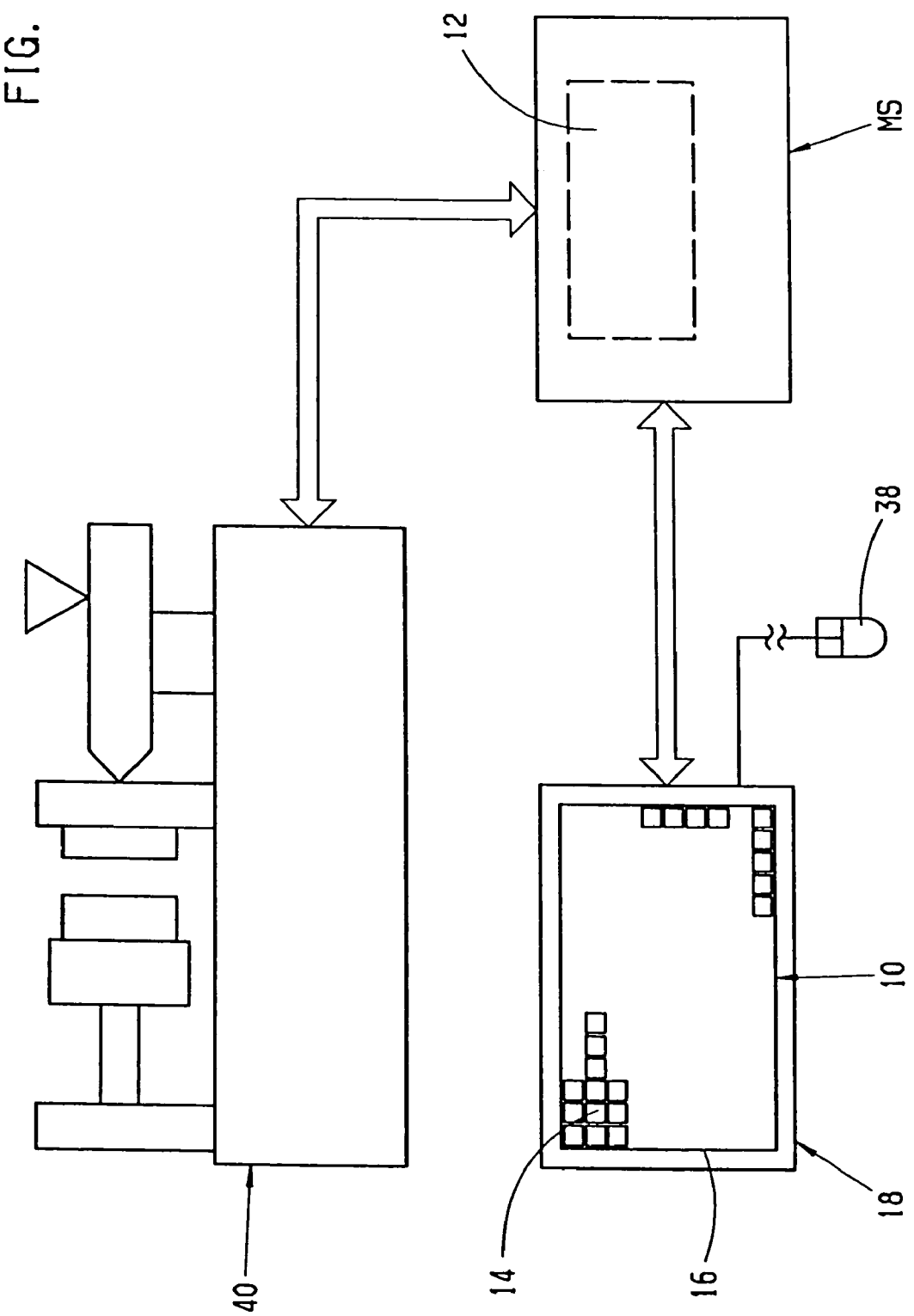
FIG. 1 is a schematic representation of the interactive machine control.

FIG. 1 is a schematic representation of the linking between input unit 10, machine control MS and a machine 40, which in the exemplified embodiment is an injection molding machine, preferably a plastics material injection molding machine for processing plastics materials and other plasticizable substances. It is completely possible, however, for it to be used on other machines. The machine control includes a data processing unit, in which, on one hand, a data set covering the basic rules of the operating sequence of the machine is already recorded. On the other hand, the data processing unit is connected to both the input unit 10 and the injection molding machine in order to allow input, for example, with regard to the operating parameters and to be in tune with the machine configuration and/or machine environment.

The input unit 10 makes it possible for the operator to input the operating parameters necessary for the machine operating sequence using input fields 14 in a form that prompts the user. The input operating parameters are stored in the data processing unit. From this information and also from the information about the machine configuration and machine environment, one or more operating sequences are then carried out in accordance with the stored operating parameters. These operating sequences can also include the start and finish processes of a machine actuating means. These can be continuous and intermittent processes such as, for example, the injection cycle of an injection molding machine or, for example, operations to mount the peripherals.

On the basis of the data set which covers the basic rules of the operating sequence of the machine, such as, for example, covering the injection molding process and the injection molding itself, the operator is offered as a result a selected choice of input possibilities, possible on the basis of the machine configuration and the machine environment. Therefore, as soon as the operator inputs one part of an operating sequence, from that point on only the additional parts of the sequence that can be added in a compatible manner to the existing parts of this operating sequence are presented to him.

This method is known from generic-forming EP 0 573 912 B1, the disclosure contents of which, in this respect, are also made the object of the present invention.

The input unit 10 includes a surface 16, on which a selected choice of actuating fields such as input fields 14, which alter as the user makes an input, are made available to the user. This selected choice is already tuned or respectively optimized to the named possible input possibilities of the operator to input additional parts of the operating sequence. Consequently it is possible to design a dynamic keyboard or dynamic input fields which alter continuously in dependence on the inputs of the user. At the same time, however, the number of selection possibilities are reduced compared to a preallocated keyboard, which means that the operator prompt is simplified.

A manual input can, for example, be effected by means of the surface 16 itself if the said surface is in the form of a touch-sensitive operator interface, on which the actuating fields are imaged. Actuation is also possible by means of a manipulator such as a mouse, a joystick, a trackball or another operator element, via which the actuating fields imaged on the surface are addressable.

Figure 2:
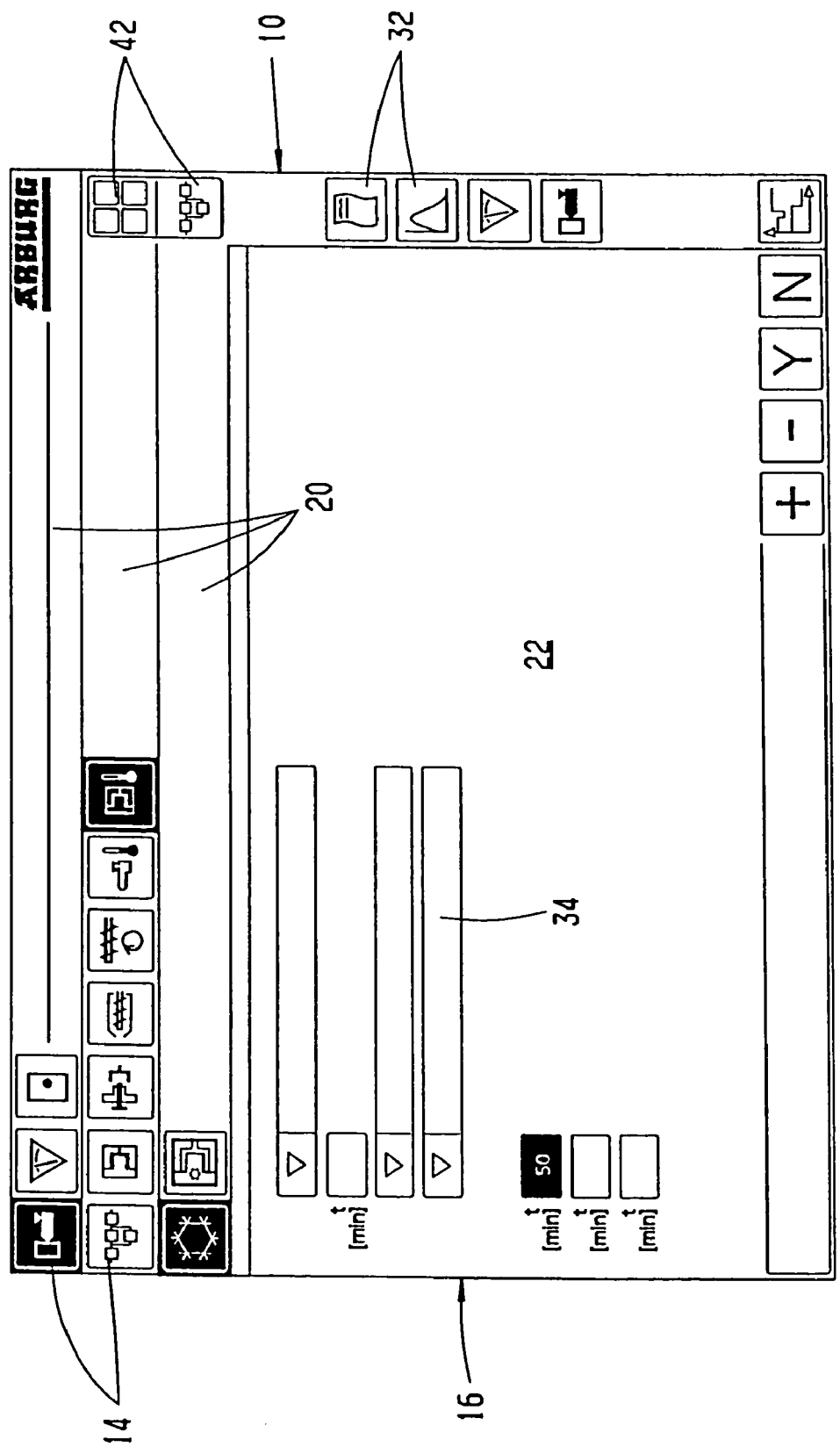
FIG. 2 is a representation of the surface of the input unit with navigation lines and parameter region such as tables.

FIG. 2 shows the surface 16 of the display unit 18 including several lines for a hierarchical navigation surface 20. Several navigation levels, which are associated with one another, can be provided in the three lines (three in the exemplified embodiment). The top two lines are preferably selection levels, whilst the third line provides an access to the parameter level, for example for the adjustment or input of individual machine parameters. As a rule three lines of control buttons or respectively input fields 14 are provided in this navigation surface, which is preferably static on the screen surface. A parameter region 22 is additionally provided below this navigation surface 20 and this parameter region 22 is for digital and/or graphic representation of the operating parameters. Where required, a sequence editor 24 representing the operating sequence in a schematic manner is imaged in addition to the navigation surface 20 and to the parameter region 22 for example in the navigation surface as is shown in FIG. 5. The shift keys 42 can be used to switch backwards and forwards between the mode of the navigation lines as in FIGS. 2 to 4, where the sequence editor is highlighted "behind" the navigation lines, and the representation in FIG. 5.

Figure 4:
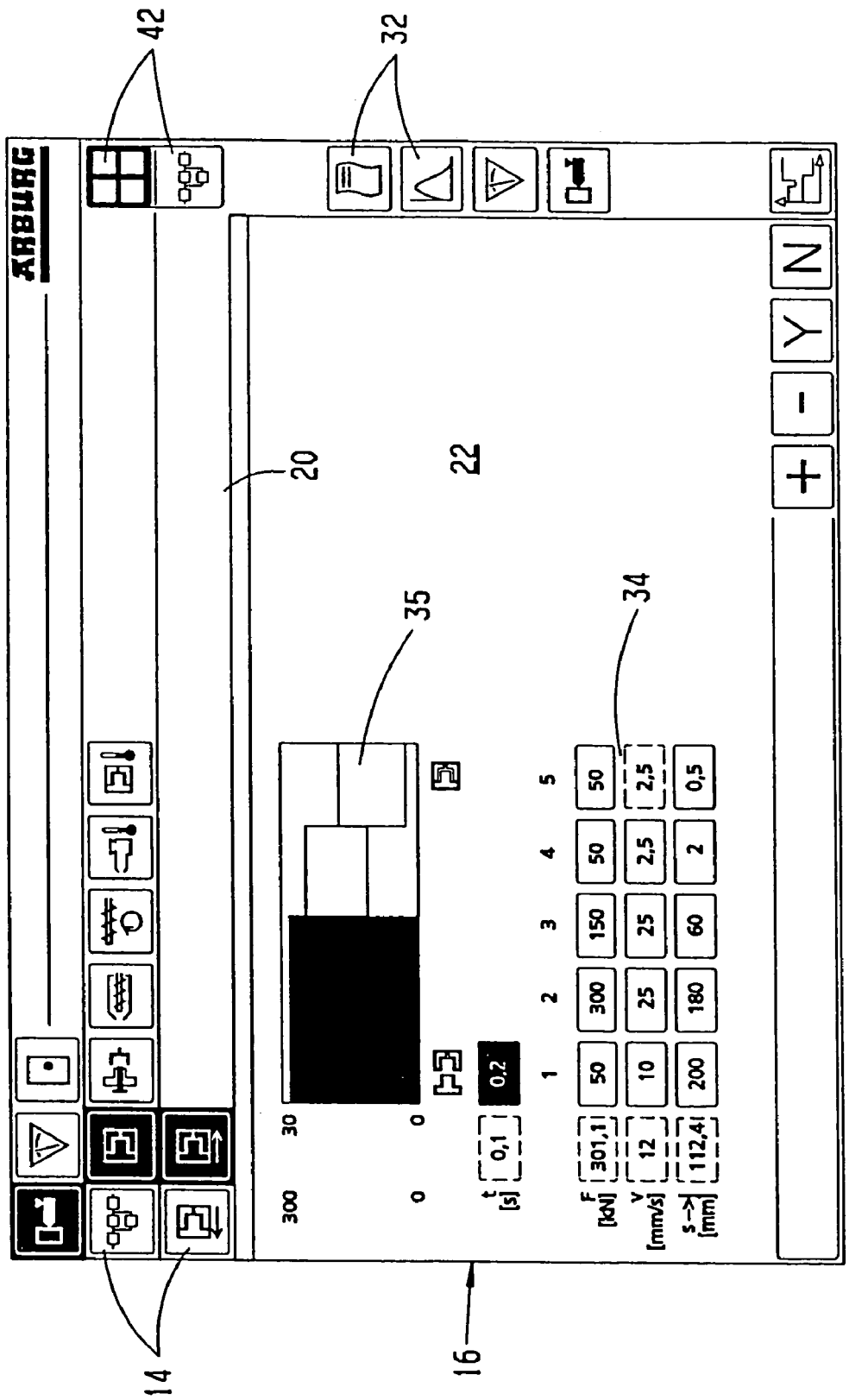
FIG. 4 is a representation of the three navigation levels with a table in the parameter region.
Figure 5:
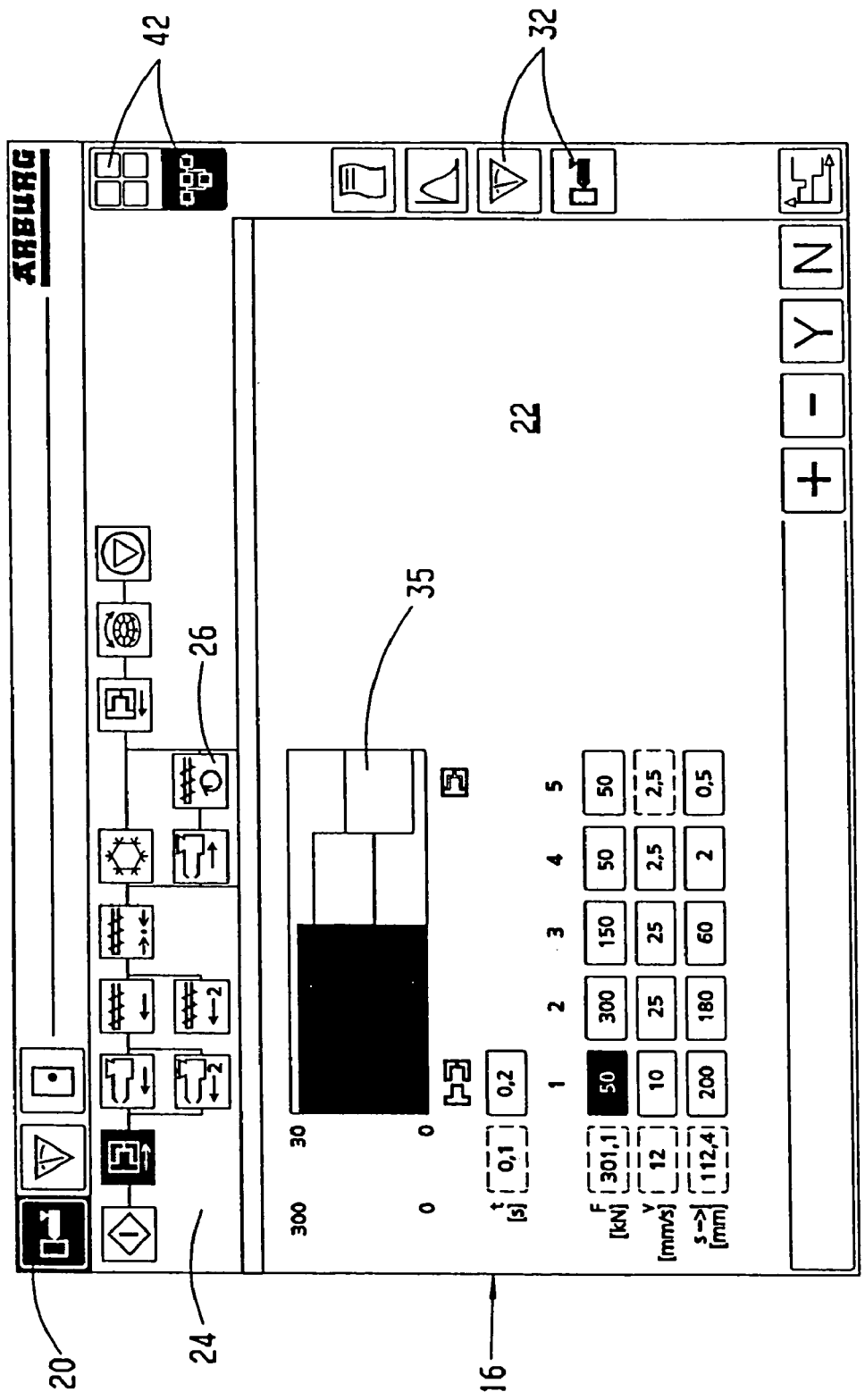
FIG. 5 is a representation as in FIG. 4 with the visible sequence editor.

The operator can see clearly, more especially from FIGS. 4 and 5 on account of the highlighted shift keys 42, in which mode he is. In principle, FIGS. 4 and 5 consequently show the same image, which for example can relate to the inputs for the closing of the mould. This can be completed in both cases by the operator by means of the different navigation variants. In FIG. 4, by way of the highlighted input fields in the top line, the operator recognizes that it is a production cycle and can read off on the second and third lines that it is the mould and the mould closing. He can input the associated values and gradients in the tables in the lower region. In FIG. 5 he receives additional information or information provided in a better manner from the sequence editor 24, otherwise the information available is identical.

The operator, in FIG. 2, is consequently in a position to view three hierarchy levels delineated up to a concrete parameter image, wherein on account of the graphically highlighted fields, which are depicted in black and white in the Figures, he always knows exactly at which point he is. Therefore, he can clearly recognize the "path" through the three levels (three in the exemplified embodiment) up to the parameter image. Consequently, the operator can see how he has arrived at the respective parameter image. Branching into other regions of the control is possible in each of the three levels. FIG. 2 shows, for example, the choice of the cooling system. In the top navigation line the symbol for the injection molding process is highlighted, in the second line the symbol for the temperature input and in the third line the symbol for the cooling. In the tables further down, on the one side can be the defaults, which, for example, relate to the switching on of the cooling water main valve, the allocation of the cooling system valves or also time inputs such as the cutout delay of the cooling system or other specific parameters.

Figure 3:
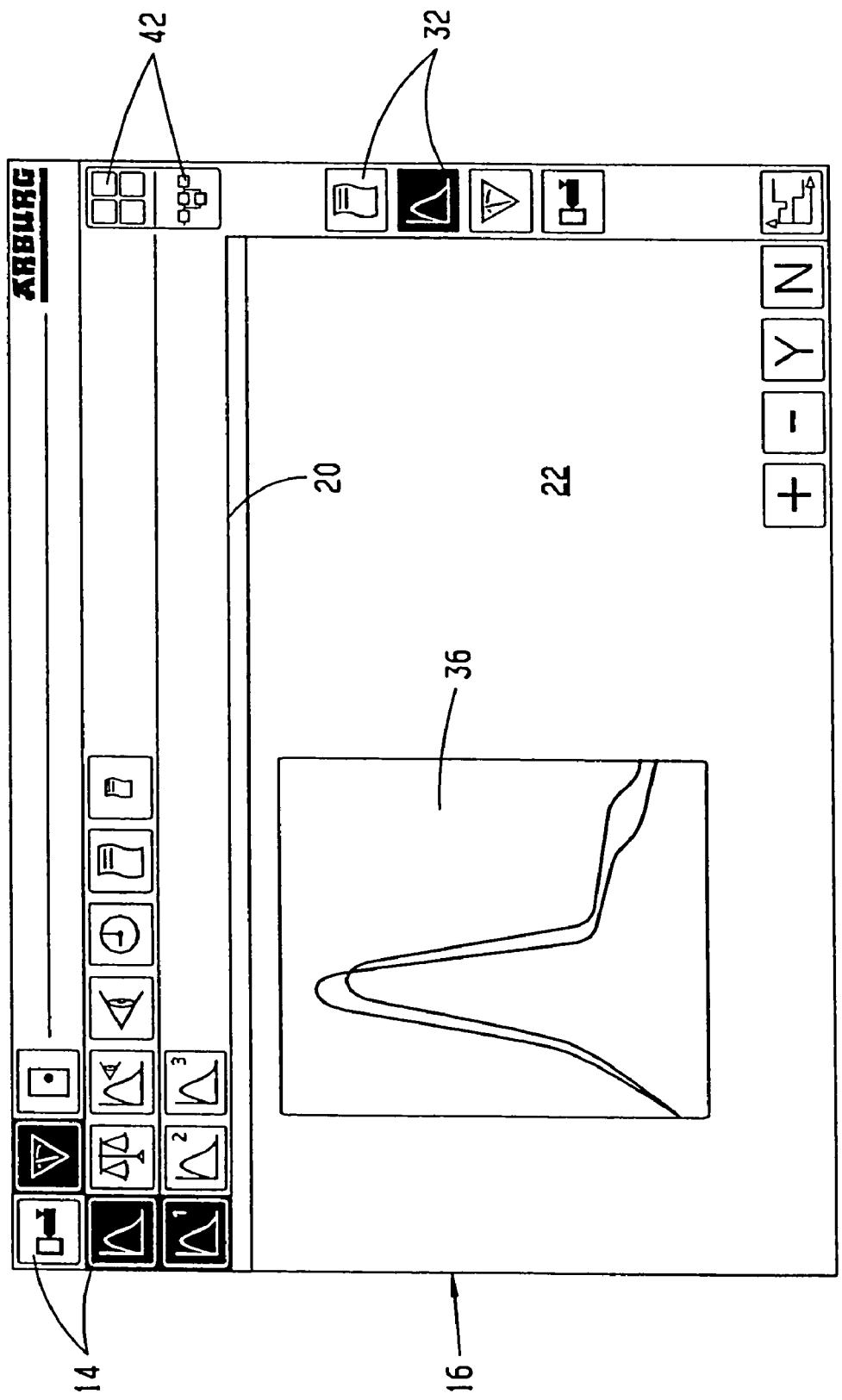
FIGS. 3, 3*a* is a representation as in FIG. 2 with a changeover between the diagram region and the monitoring region.

The image contents are represented in tabular and/or graphic form, as is shown in FIGS. 2 to 5. The tapping of a sequence symbol 26 causes branching, in this case, in the bottom navigation level into the group of the parameter images associated with the chosen axis. Preferably on the basis of tables, a non-editable graphic representation is created for the input parameters, said non-editable graphic representation already containing the converted required values, that is, for example, a graphic representation in which internal time delays, gradients etc of the machine have already been calculated. However it is also possible to provide an editable input graphic representation 36 on the surface 16 and the operator can carry out and understand changes by means of touch or manipulation using this editable input graphic representation. FIG. 3 shows, for example, the input of monitoring parameters as the highlighted input field in the top line. In the second line the associated subgroups are selected, in this case, for example three parameter images can be preset as a result. This parameter image can be provided with the corresponding tolerances as in FIG. 3a.

Figure 3A:
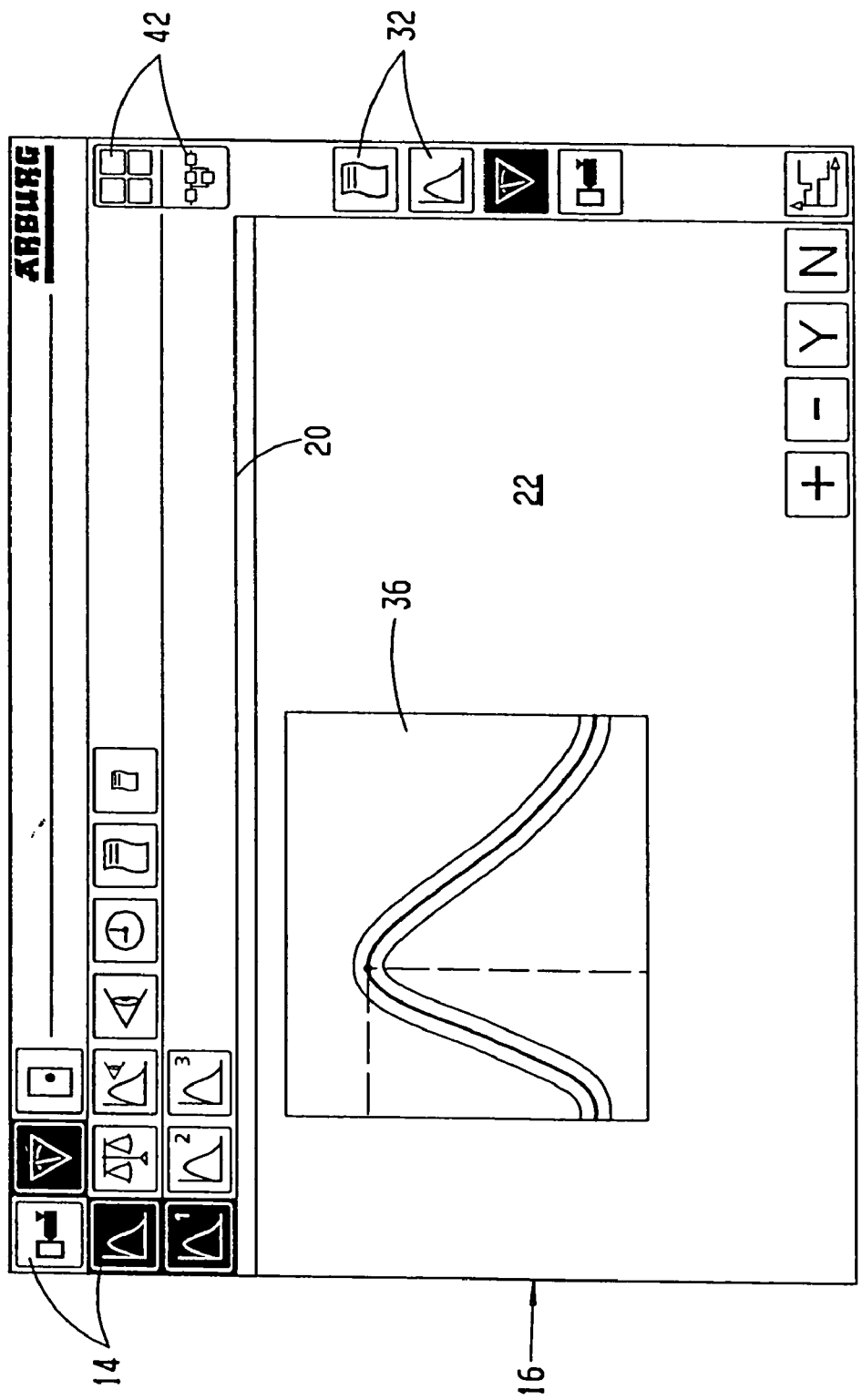

In addition, in FIGS. 2 to 5, an operator region can be provided and fields in the form of favorite fields 32 can be preset or respectively are presettable by the manufacturer or user on this operator region. They enable in each case a direct jump into a defined parameter image of the control surface by bypassing the navigation steps of the previously defined hierarchical or sequence-connected navigation variants actually required to do so. However, the control does not always show the same parameter image when a specific favorite field 32 is activated but displays the last parameter image edited in the associated parameter group. Several of these favorite fields 32, consequently, when they interact, make it possible to jump directly backwards and forwards between image regions that are not associated together in a strictly hierarchical manner but which often have to be edited or observed alternately in the operating sequence. These favorite fields are represented on the right-hand edge in FIGS. 2 to 5 and enable direct access to a region or respectively a parameter image from the areas of production, actual value recording, monitoring etc. In particular FIGS. 3 and 3a show this type of switching to and fro between the diagram of a sequence in FIG. 3 and the associated monitoring region, which is however usually not directly linked, for the input and/or representation of the tolerance band regions in FIG. 3a.

The input diagram 36 can be configured in such a manner that it can be modified either using the preceding tables 34 or using the diagram itself either directly, for example using a touch screen or indirectly by means of a manipulator. The tables are represented preferably in machine view, that-is-to-say the input in the tables is effected in each case always in the direction of displacement for the different directions of displacement of the axes, that-is-to-say not always in the time sequence, that is from left to right. In the case of an injection molding machine, this could be, for example, the closing movement and then opening movement of an injection molding tool.

With this navigation variant, it is only possible to navigate the sides of the parameter image that relate to one axis of the injection molding machine, which are therefore sequence-connected. Other sides of the parameter that are not directly related to the axis cannot be obtained in this manner. The term "axis" in this case refers to a certain drive train of the machine, such as, for example, in the case of an injection molding machine, the nozzle displacement unit, the injection unit or the mould closing unit.

Alternatively, as shown in FIG. 5, there is the possibility of using the line-wise representation in the navigation process in such a manner that in one, for example in the top line, just one symbol is used for the higher navigation levels. The other lines can be used for the navigation process covering the machine sequence.

In the event of an alarm, the symbols of the operating sequence relating to the alarm are correspondingly identified. A tapping of the alarm symbols identified in this way results in the representation by means of a direct jump into the parameter region concerned. This means that a rapid user prompt is possible in the event of an alarm.

Alternatively the line-wise representations can also be undertaken in a column-wise manner and the column-wise representations can be undertaken in a line-wise manner. The goal is as user-friendly an operator prompt as possible together with simplification of operation and all the time optimizing the adjustment times for a machine. The preferred area of application is a plastics material injection molding machine. Finally, the entire method can also be stored on a data carrier.

It is obvious that this description can be subject to the most varied modifications, changes and adaptation, which range in the region of equivalents to the attached claims.

LIST OF REFERENCES

10 Input unit
12 Data processing unit
14 Input field
16 Touch-sensitive surface
18 Display unit
20 Navigation surface
22 Parameter region
24 Sequence editor
26 Sequence symbol
32 Favorite field
34 Table
35 Non-editable graphic representation
36 Input diagram
38 Manipulator
40 Machine
42 Shift keys
MS Machine control

The invention claimed is:

1. A method for interactive control of a plastics material injection molding machine, where, via an input unit, which is provided with actuating fields, operating parameters necessary for an operating sequence of a machine are input, in a form which prompts an operator, into a data processing unit which stores these operating parameters, and subsequently one or more operating sequences are carried out in accordance with the stored operating parameters, the method comprising:

recording a data set covering basic rules of the operating sequence of the machine in the data processing unit and, by using the data set, providing the operator on a graphical user interface with visualization of a selected choice of input possibilities, based on a machine configuration and a machine environment, for additional parts of the operating sequence that can be added in a compatible manner into existing parts of the operating sequence;

providing to an operator, for manual input and/or for input by means of a manipulator, on the graphical user interface a selected choice of actuating fields corresponding to the additional parts of the operating sequence and for navigation on a navigation surface statically arranged on the graphical user interface;

wherein the navigation surface comprises at least three lines or three columns of actuating and input fields that are hierarchical from line to line or column to column and are represented in the graphical user interface with a plurality of navigation levels associated with one another such that the operator is able to visualize a path through the at least three lines or three columns of actuating and input fields; and wherein, when the operator's input is made, even at a hierarchically higher level input paths are visualized as a selected choice based on the operator's input.

2. The method according to claim 1, wherein the actuating fields are imaged as input fields.

3. The method according to claim 1, wherein the navigation surface is represented with three lines.

4. The method according to claim 1, further comprising the step of representing a parameter region on the graphical user interface for numeric and/or graphic representation of operating parameters.

5. The method according to claim 1, further comprising the step of representing a sequence editor representing the operating sequence in a schematic manner on the surface graphical user interface in addition to the plurality of navigation levels.

6. The method according to claim 1, wherein the operating sequence comprises a plurality of sequence symbols, and, when a sequence symbol of the plurality of sequence symbols is tapped, parameter images associated with the sequence symbol are displayed on the respective navigation level.

7. The method according to claim 1, wherein the navigation levels comprise at least one top navigation level and at least one bottom navigation level and when three navigation levels are provided, the at least one top navigation level is represented symbolically in one line, and the at least one bottom navigation level is represented completely in the additional lines.

8. The method according to claim 1, wherein the operating sequence comprises sequence symbols and in the event of an alarm, the sequence symbols of the operating sequence relating to the alarm are identified and wherein tapping the sequence symbols leads to the representation of a relevant parameter region.

9. The method according to claim 1, further comprising the step of providing favorite fields that are preset or are presettable on the graphical user interface by the operator and when actuated the favorite fields lead to a jump, independent of the navigation, to a preset or presettable parameter group.

10. The method according to claim 9, wherein when the favorite field is actuated, a parameter image edited last in the associated parameter group is displayed.

11. The method according to claim 1, further comprising the step of representing tables on the graphical user interface for inputting operating parameters and wherein, from these, a preferably non-editable graphic representation of the required values converted therefrom is generated.

12. The method according to claim 1, further comprising the step of representing an editable input diagram on the graphical user interface.

13. The method according to claim 12, wherein the representation of the input of the operating parameters for various directions of axes displacement of the plastics material injection molding machine is effected in the direction of axes displacement.

14. The method according to claim 1, wherein the method is carried out on a cyclically operating plastics material injection molding machine.

15. An apparatus for interactive control of a plastics material injection molding machine, the apparatus comprising:
a display unit;
a data processing unit;
an input unit with fields arranged on a graphical user interface for manual input and/or for input by means of a manipulator, by means of which fields, in a form which prompts an operator, operating parameters necessary for an operating sequence of the machine can be input into the data processing unit which stores the operating parameters for subsequently carrying out one or more operating sequences in accordance with the stored operating parameters, wherein the fields are actuating fields for navigation on a navigation surface statically arranged on the graphical user interface, and
a data set recorded in the data processing unit and covering basic rules of the operating sequence of the machine;
wherein the data set provides a selected choice of possible input possibilities for additional parts of the operating sequence, said possible input possibilities being offered to the operator, displayed on-surface the graphical user interface, and based on machine configuration and machine environment, such that the additional parts of the operating sequence can be added in a compatible manner into existing parts of the operating sequence;
wherein the navigation surface comprises at least three lines or three columns of actuating and input fields that are hierarchical from line to line or column to column and are represented in the graphical user interface with a plurality of navigation levels associated with one another such that the operator is able to visualize a path through the at least three lines or three columns of actuating and input fields; and
wherein, when the operator's input is made, even at a hierarchically higher level possible input paths are visualized as a selected choice based on the operator's input.

16. The apparatus according to claim 15, wherein the actuating fields are imaged as the input fields.

17. The apparatus according to claim 15, wherein the navigation surface includes three lines.

18. The apparatus according to claim 15, further comprising a parameter region provided on the graphical user interface for numeric and/or graphic representation of the operating parameters.

19. The apparatus according to claim 15, further comprising a sequence editor representing the operating sequence in a schematic manner on the graphical user interface in addition to the plurality of navigation levels.

20. The apparatus according to claim 15, wherein the navigation levels comprise at least one top navigation level and at least one bottom navigation level and when three navigation levels are provided, sequence symbols for the at least one top navigation level is provided in one line, and elements of the at least one bottom navigation level where necessary are provided completely in the additional lines.

21. The apparatus according to claim 15, further comprising identification means for identifying sequence symbols of the operating sequence related to an alarm.

22. The apparatus according to claim 15, further comprising preset favorite fields or favorite fields that are presettable by the operator, said preset favorite fields or said favorite fields that are presettable by the operator being provided as jump keys on the graphical user interface for a jump independent of the navigation to a preset or presettable parameter group.

23. The apparatus according to claim 22, further comprising a linking of the jump keys with a parameter image last edited within the associated parameter group.

24. The apparatus according to claim 15, further comprising, on the graphical user interface, a non-editable graphic representation of required values converted from the input parameters and/or an editable input diagram.

25. A non-transitory computer readable medium comprising a program for the accomplishment of the method according to claim 1.

* * * * *

UNITED STATES PATENT AND TRADEMARK OFFICE
CERTIFICATE OF CORRECTION

PATENT NO. : 7,890,880 B2  Page 1 of 1
APPLICATION NO. : 10/562987
DATED : February 15, 2011
INVENTOR(S) : Karl Hehl It is certified that error appears in the above-identified patent and that said Letters Patent is hereby corrected as shown below:

Claim 1, col. 6, line 44: Change the wording to: hierarchically higher level --possible-- input paths are visualized Claim 5, col. 6, line 56: Delete the word "surface"

Claim 15, col. 7, line 53: Delete "-surface"

Signed and Sealed this
Twenty-ninth Day of March, 2011

David J. Kappos
*Director of the United States Patent and Trademark Office*